US006511109B1

(12) United States Patent
Schultz et al.

(10) Patent No.: US 6,511,109 B1
(45) Date of Patent: Jan. 28, 2003

(54) BUMPER SYSTEM FOR AN AUTOMOTIVE VEHICLE

(75) Inventors: John P. Schultz, St. Clair Shores, MI (US); Julie Brown, Dearborn, MI (US); Andrew Billiu, Farmington Hills, MI (US)

(73) Assignee: Plastech Engineered Products, Inc., Dearborn, MI (US)

(*) Notice: Subject to any disclaimer, the term of this patent is extended or adjusted under 35 U.S.C. 154(b) by 0 days.

(21) Appl. No.: 09/523,246

(22) Filed: Mar. 10, 2000

(51) Int. Cl.[7] .......................... B60R 19/03; B60R 19/02

(52) U.S. Cl. ........................ 293/120; 293/142; 293/102

(58) Field of Search ................................ 293/120, 122, 293/142, 102

(56) References Cited

U.S. PATENT DOCUMENTS

| | | | | | |
|---|---|---|---|---|---|
| 3,441,305 | A | * | 4/1969 | Trammell, Jr. | 293/128 |
| 3,556,745 | A | * | 1/1971 | Zaremski | 293/120 |
| 3,638,985 | A | * | 2/1972 | Barton et al. | 293/122 |
| 3,841,680 | A | * | 10/1974 | Muller | 293/63 |
| 3,869,167 | A | * | 3/1975 | Muller | 293/122 |
| 4,050,689 | A | * | 9/1977 | Barton et al. | 293/122 |
| 4,154,469 | A | * | 5/1979 | Goupy et al. | 293/120 |
| 4,348,042 | A | * | 9/1982 | Scrivo | 293/120 |
| 4,364,591 | A | * | 12/1982 | Bien | 293/102 |
| 4,466,646 | A | * | 8/1984 | Delmastro et al. | 293/120 |
| 4,482,180 | A | | 11/1984 | Huber et al. | |
| 4,533,166 | A | * | 8/1985 | Stokes | 293/120 |
| 4,545,105 | A | | 10/1985 | Kowalsky | |
| 4,569,865 | A | | 2/1986 | Placek | |
| 4,930,823 | A | * | 6/1990 | Rivera | 293/120 |
| 5,114,198 | A | * | 5/1992 | Yamashita et al. | 293/120 |
| 5,131,702 | A | * | 7/1992 | Matthysse et al. | 293/121 |
| 5,141,273 | A | * | 8/1992 | Freeman | 293/120 |
| 5,219,197 | A | * | 6/1993 | Rich et al. | 293/120 |
| 5,252,160 | A | * | 10/1993 | Scanlon et al. | 156/196 |
| 5,269,574 | A | * | 12/1993 | Bhutani et al. | 293/120 |
| 5,672,405 | A | | 9/1997 | Plank, Jr. et al. | |
| 5,688,006 | A | | 11/1997 | Bladow et al. | |
| 5,711,562 | A | | 1/1998 | Terada et al. | |
| 5,799,991 | A | * | 9/1998 | Glance | 293/121 |
| 5,845,948 | A | | 12/1998 | Anderson et al. | |
| 5,988,713 | A | * | 11/1999 | Okamura et al. | 293/120 |
| 6,082,792 | A | * | 7/2000 | Evans et al. | 293/120 |
| 6,099,055 | A | * | 8/2000 | Hirota et al. | 293/120 |
| 6,315,339 | B1 | * | 11/2001 | Devilliers et al. | 293/120 |

FOREIGN PATENT DOCUMENTS

| | | | | |
|---|---|---|---|---|
| FR | 2702432 | * | 9/1994 | 293/120 |
| GB | 2030082 | * | 4/1980 | 293/120 |
| GB | 2134858 | * | 8/1984 | 293/120 |
| JP | 0172848 | * | 10/1982 | 293/120 |
| JP | 11255049 | * | 9/1999 | |

* cited by examiner

*Primary Examiner*—D. Glenn Dayoan
*Assistant Examiner*—H. Gutman
(74) *Attorney, Agent, or Firm*—Young & Basile PC

(57) ABSTRACT

A bumper system 10 for an automotive vehicle is provided. The bumper system includes a composite valance 12 adapted for attachment to a chassis of the automotive vehicle, where the composite valance includes a reinforcement section 18 formed therein. Preferably, the reinforcement section is formed longitudinally along a central portion of the composite valance, is recessed with respect to a front surface 22 of the composite valance, and includes a plurality of structural ribs 24 provided therein. A cover beam 28, preferably constructed from a metallic material, is adapted for attachment to the composite valance. The cover beam is sized to substantially cover the reinforcement section when attached to the composite valance, and give the bumper system an overall metallic appearance.

20 Claims, 2 Drawing Sheets

BUMPER SYSTEM FOR AN AUTOMOTIVE VEHICLE

TECHNICAL FIELD

This invention relates to a bumper system for an automotive vehicle.

BACKGROUND ART

In order to adhere to federal safety standards, automotive bumper systems must be designed with sufficient strength in order to meet a number of low speed bumper impact requirements. Concurrently, fuel economy concerns have required that automotive bumpers be constructed to have low weight, aerodynamic configurations.

While bumpers constructed entirely of metal typically provide the strength required to resist permanent deformation upon impact, they suffer the disadvantage of being excessively heavy. To reduce weight, many automobile manufacturers have replaced metal bumpers with plastic bumpers. From a decorative point of view, however, plastic bumpers lack the chromed metallic appearance favored by consumers, as well as the sturdy "feel" of a metal bumper.

In an attempt to create a metallic look and feel using a plastic bumper, some plastic bumpers have been provided with decorative metal strip inserts. These strips typically comprise thin metal foil covered by a transparent plastic protective layer. Unfortunately, the appearance of such metal foil strips is easily marred by minor scratches and collisions. Alternatively, metal can be used to partially or completely cover a plastic bumper surface by applying a vapor metal deposit, by applying a metal mist to the bumper surface in a vacuum, by applying the metal onto a conductive bumper surface, or by dipping the plastic bumper into a chroming tank, wherein all of these processes are susceptible to having metal flake off the bumper surface. Still other attempts to mimic an all metal bumper have involved adhesively bonding thin metal sheets over a plastic bumper, as described in U.S. Pat. No. 4,545,105 issued to Kowalsky and U.S. Pat. No. 4,569,865 issued to Placek. However, such methods of covering a plastic bumper entirely with metal can be both complicated and time consuming.

DISCLOSURE OF INVENTION

Therefore, it is an object of the present invention to provide a bumper system that is strong and lightweight while providing a metallic appearance.

It is a further object of the present invention to provide a bumper system having a metallic appearance with high durability.

It is a still further object of the present invention to provide a bumper system that incorporates a metallic appearance without requiring a complex assembly process.

It is another object of the present invention to provide a bumper system that incorporates several components into an integrated structure.

Accordingly, a bumper system for a vehicle is provided. The bumper system includes a composite valance adapted for attachment to the vehicle, where the composite valance includes a reinforcement section. The bumper system further includes a cover beam adapted for attachment to the vehicle, wherein the cover beam is sized to substantially cover the reinforcement section when attached to the vehicle.

According to a preferred embodiment of the present invention, the bumper system is provided for an automotive vehicle, and the composite valance is adapted for attachment to a chassis of the automotive vehicle. The composite valance can be attached to a front end or a rear end of the chassis, and the cover beam is preferably attached directly to the composite valance.

Preferably, the reinforcement section is formed longitudinally along a central portion of the composite valance. Furthermore, the reinforcement section is preferably recessed with respect to a front surface of the composite valance and includes a plurality of structural ribs provided therein. In addition, the composite valance preferably includes apertures formed therein that are sized to receive accessories, such as headlamps, for the vehicle.

In further accordance with a preferred embodiment of the present invention, the composite valance is constructed from a plastic material, such as thermoplastic olefin, and the cover beam is constructed from a metallic material, such as steel. Then, upon attachment of the cover beam to the composite valance, the bumper system is advantageously provided with an overall metallic appearance.

The above objects and other objects, features, and advantages of the present invention are more readily understood following a review of the attached drawings and the accompanying specification and claims.

BEST MODE FOR CARRYING OUT THE INVENTION

Figure 1:
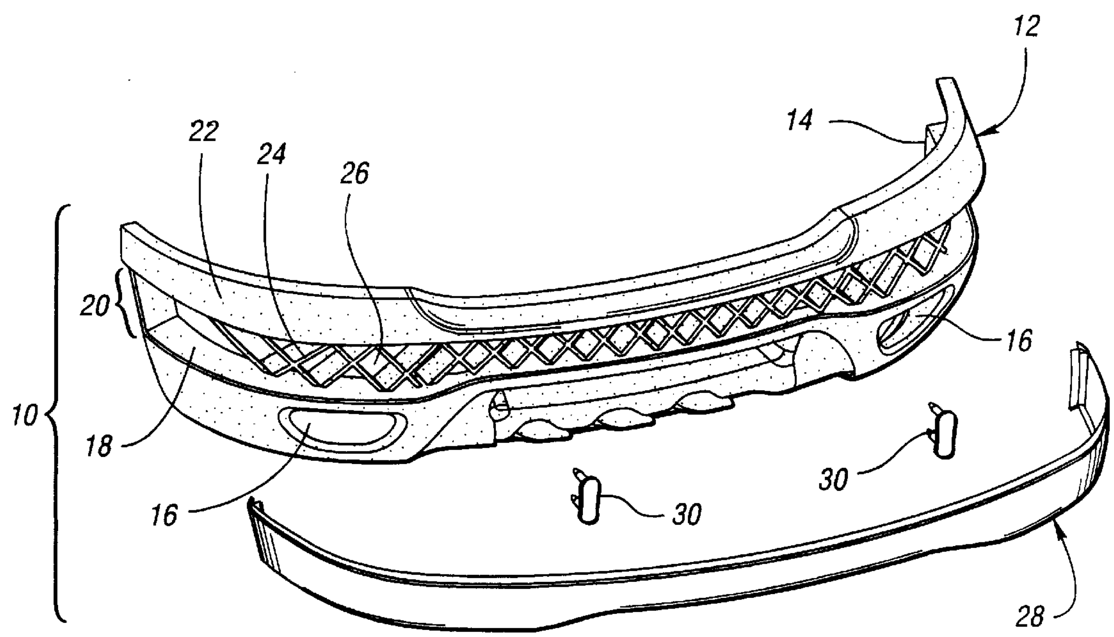
FIG. 1 is an exploded view of the components of the bumper system of the present invention.
Figure 2:
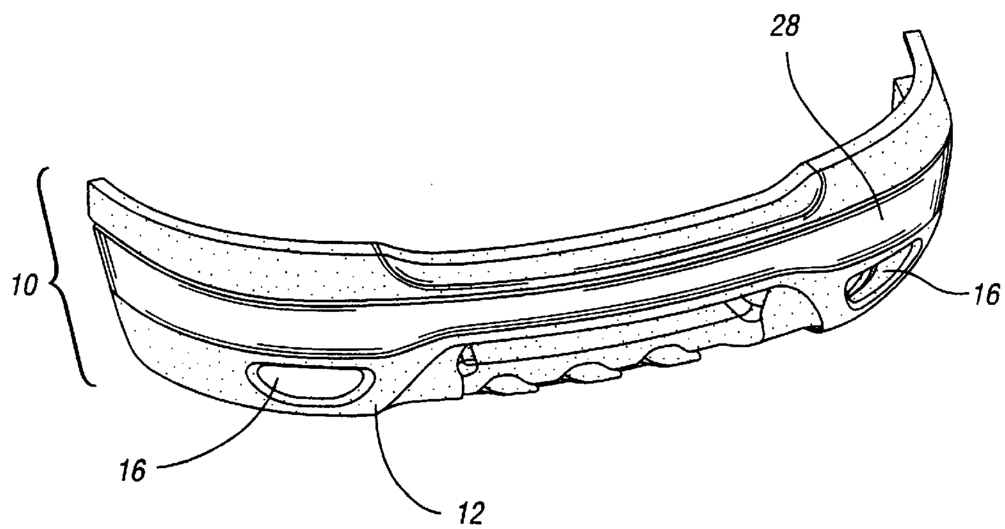
FIG. 2 is a perspective view of the bumper system of FIG. 1 when assembled.
Figure 4:
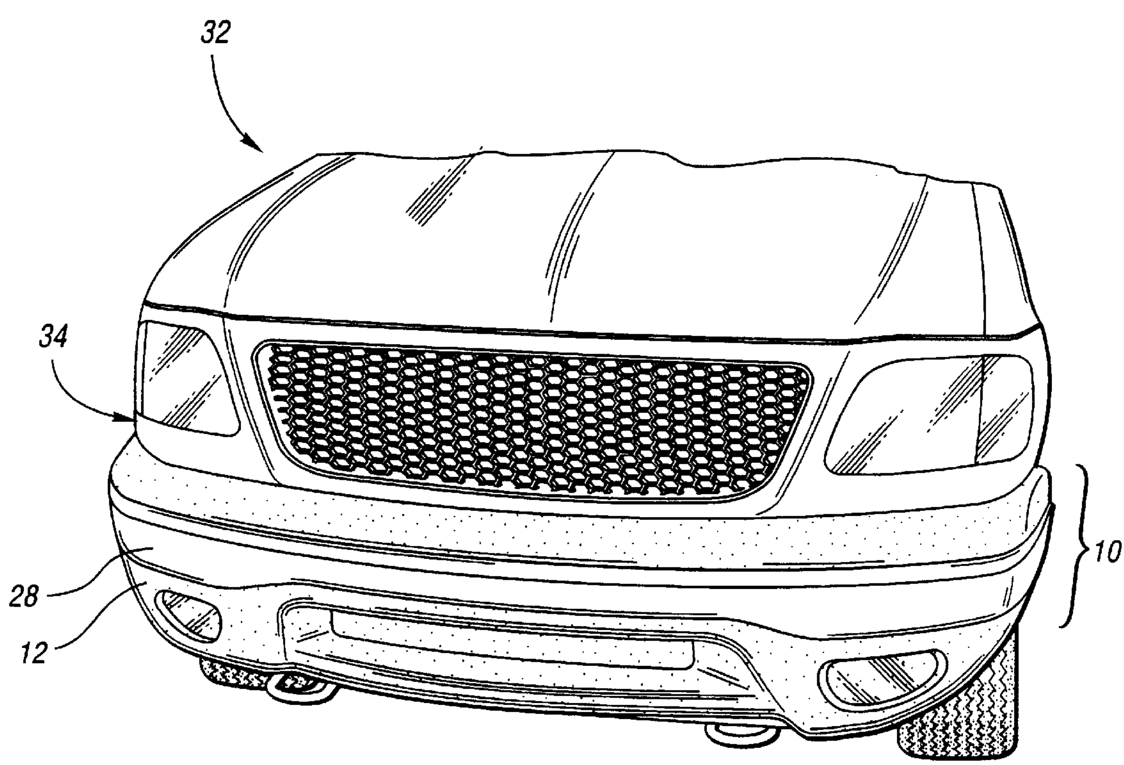
FIG. 4 shows the bumper system of the present invention attached to the front end of an automobile chassis.

Referring first to FIG. 1, an exploded view of a bumper system constructed in accordance with the present invention is shown and designated generally by the reference numeral 10. In contrast to using conventional top and bottom valance covers to form the top and bottom show surfaces of the bumper, respectively, bumper system 10 of the present invention includes a one-piece, arcuate composite or plastic valance or member 12 which provides both the top and bottom bumper show or exterior surfaces in a integrated structure. As shown in FIGS. 1–2 and 4, the first and second exterior surfaces exceed greater than he width of the vehicle around corners of the vehicle. Composite valance 12 is adapted for attachment to a vehicle, as described in greater detail below, and is preferably sized to extend across a front or rear end of an automobile chassis.

In a preferred embodiment, composite valance 12 is constructed from a plastic material, preferably thermoplastic olefin, such that composite valance 12 of the present invention is lightweight and low in cost. With conventional bumper assemblies, frame brackets and corner brackets are separate steel parts that are used to mount bumper components to the vehicle, thus adding time, weight, and complexity to the assembly process, In contrast, composite valance 12 of the present invention preferably includes these vehicle attachments (not shown) integrally mounted to a back surface 14 thereof. Composite valance 12 preferably further includes apertures 16 formed therein that a re sized to receive accessories, such as headlamps (best shown in FIG.

4), for the vehicle. In addition, composite valance 12 can include any other surface features desired for its particular application.

Still referring to FIG. 1, composite valance 12 includes a reinforcement section 18 formed therein. The reinforcing portion is integrally formed with respect to the first and second exterior surfaces and can end between the first and second exterior surfaces as shown in FIGS. 1–4. Preferably, reinforcement section 18 is formed longitudinally along a central portion 20 of composite valance 12 and is recessed with respect to a front surface 22 of composite valance 12, defining a channel. As seen in FIGS. 1–2 and 4, the channel can have at least first and second widths. Reinforcement section 18 functions to strengthen composite valance 12 as well as provide impact resistance via a plurality of structural ribs 24 provided therein. In a preferred embodiment, structural ribs 24 are integrally formed with composite valance 12, and also copse a plastic material. As seen in FIGS. 1–2 and 4, the ribs can be disposed along a predetermined distance of the length of the reinforcing portion, less than the entire length of the reinforcing portions Each of the ribs can be disposed at an angle of less than ninety degrees with respect to a longitudinal axis of the channel of the reinforcing portion between the first and second exterior surfaces.

Structural ribs 24 preferably extend along entire reinforcement section 18 in a lattice type configuration, as shown in FIG. 1. With this configuration, hollow interior portions 26 are defined between structural ribs 24, thereby reducing the amount of plastic material required to construct structural ribs 24 and keeping composite valance 12 lightweight. In addition, hollow interior portions 26 provide flexibility to composite valance 12, which is beneficial for impact resistance. Although a particular configuration of structural ribs 24 is shown and described herein, it is understood that structural ribs 24 can be disposed in any configuration suitable to reinforce composite valance 12, and therefore bumper system 10.

Figure 3:
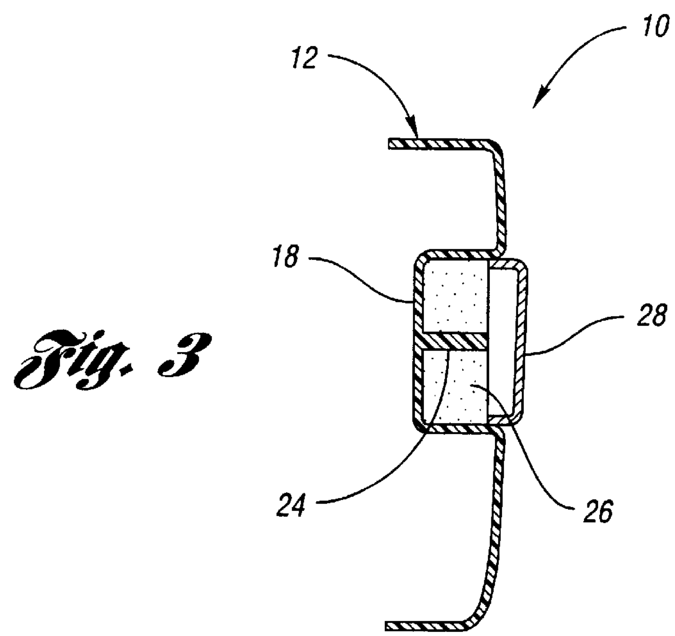
FIG. 3 is a cross-sectional view of the assembled bumper system.

Referring again to FIG. 1, bumper system 10 further includes a cover beam 28 adapted for attachment to the vehicle as an additional show surface. Cover beam 28 is preferably constructed from a metallic material, such as stainless steel, and is positioned and si to substantially cover reinforcement section 18 when attached to the vehicle. A cross-sectional view of cover beam 28 attached to composite valance 12 is shown in FIG. 3. In a preferred embodiment, cover beam 28 is attached directly to composite valance 12 via stud plates 30 (FIG. 1). Upon attachment of cover beam 28 to composite valance 12, bumper system 10 is advantageously provided with an overall metallic appearance as well as the "feel" of a conventional all-metal bumper at a fraction of the cost and weight The metallic appearance of bumper system 10 provided by cover beam 28 is durable and is not complex to assemble. Furthermore, in contrast to an all-plastic bumper, cover beam 28 of the present invention can be chrome-plated or painted if desired. The one-piece metal arcuate cover beam 28 can be removably engageable with the one-piece plastic arcuate member or composite valence 12 such that the first and second exterior surfaces are discontinuous when the one-piece metal arcuate member is engaged with the one-piece plastic arcuate member.

In conventional bumper assemblies, components must be shipped from suppliers to the OEM assembly plant in order to complete the trim and final assembly. Given the number of components needing to be attached to the vehicle separately, the installation of conventional bumper assemblies requires multiple operators and work stations. In contrast, using bumper system 10 of the present invention, all components can be mounted by a single supplier and bumper system 10 shipped from the supplier to the OEM assembly plant as an integrated unit. Then, requiring only one step, bumper system 10 can be installed to the vehicle. More particularly, composite valance 12 and molded-in vehicle attachments (not shown) allow several components to be attached to the vehicle as an integrated unit. Therefore, use of bumper system 10 eliminates work stations and improves floor space utilization at the OEM assembly plant. Alternatively, bumper system 10 of the present invention may be integrated at a later point in the assembly process. Specifically, cover beam 28 can be installed to composite valance 12 at any time before or after composite valance 12 is attached to an automotive vehicle.

Bumper system 10 of the present invention is suitable for attachment to any vehicle, most preferably to a chassis of an automotive vehicle 32, as illustrated schematically in FIG. 4. Although FIG. 4 depicts bumper system 10 attached to a front end 34 of the automobile chassis, bumper system 10 can just as readily be attached to a rear end of the chassis.

While embodiments of the invention have been illustrated and described, it is not intended that these embodiments illustrate and describe all possible forms of the invention. Rather, the words used are words of description rather than limitation, and it is understood that various changes may be made without departing from the spirit and scope of the invention.

What is claimed is:

1. A bumper for a vehicle comprising;

a one-piece plastic arcuate member defining at least first and second distinct exterior surfaces of the vehicle that extend greater than a width of the vehicle and a reinforcing portion integrally formed with respect to each other, the reinforcing portion having a length and extending between the first and second exterior surfaces; and a one-piece metal arcuate member removably engageable with the one-piece plastic arcuate member adjacent the reinforcing portion and longitudinally centered with respect to the length of the reinforcing portion, the reinforcing portion disposed between the one-piece metal arcuate member and the vehicle when the one-piece plastic arcuate member is engaged with the vehicle, the one-piece metal arcuate member having a width approximately equal to a width of the reinforcing portion such that the first and second exterior surfaces are discontinuous when the one-piece metal arcuate member is engaged with the one-piece plastic arcuate member.

2. The bumper of claim 1 further comprising:

the reinforcing portion including a channel extending the length of the reinforcing portion, the channel outwardly facing with respect to the vehicle when the one-piece plastic arcuate member is engaged with the vehicle, the channel having at least first and second widths along the length of the reinforcing portion.

3. The bumper of claim 1 further comprising:

the reinforcing portion including a plurality of ribs disposed along a predetermined distance of the length where the predetermined distance is less than the length of the reinforcing portion and a plurality of gaps formed between the ribs.

4. The bumper of claim 3 further comprising:

the plurality of ribs formed as a lattice such that each of the plurality of ribs is disposed at an angle of less than ninety degrees with respect to a longitudinal axis of the reinforcing portion between the first and second exterior surfaces.

5. The bumper of claim 3 further comprising:

the plurality of ribs longitudinally centered with respect to the length of the reinforcing portion and disposed in a channel defined by the reinforcing portion.

6. The bumper of claim 1 further comprising:

the reinforcing portion having an outwardly-facing surface recessed with respect to an inwardly-facing surface of one of a top portion and a bottom portion of the one-piece plastic arcuate member.

7. The bumper of claim 1 wherein the one-piece plastic arcuate member further comprises:

a bottom portion having at least one aperture for receiving a light generating device.

8. The bumper of claim 1 further comprising:

the metal arcuate member formed of stainless steel.

9. The bumper of claim 1 further comprising:

the metal arcuate member is chrome plated.

10. The bumper of claim 1 further comprising:

the plastic arcuate member formed of a thermoplastic olefinic material.

11. A method of manufacturing a bumper for a vehicle comprising the steps of:

forming a one-piece plastic arcuate member defining at least first and second distinct exterior surfaces of the vehicle that extend greater than a width of the vehicle and a reinforcing portion integrally formed with respect to each other, the reinforcing portion having a length and extending between the first and second exterior surfaces; and removably engaging a one-piece metal arcuate member with the one-piece plastic arcuate member adjacent the reinforcing portion and longitudinally centered with respect to die length of the reinforcing portion, the reinforcing portion disposed between the one-piece metal arcuate member and the vehicle when the one-piece plastic arcuate member is engaged with the vehicle, the one-piece metal arcuate member having a width approximately equal to a width of the reinforcing portion such that the first and second exterior surfaces are discontinuous when the one-piece metal arcuate member is engaged with the one-piece plastic arcuate member.

12. The method of manufacturing of claim 11 further comprising the step of:

engaging at least one bracket to the plastic arcuate member, the at least one bracket for engaging the one-piece metal arcuate member with the one-piece plastic arcuate member.

13. The method of manufacturing of claim 11 further comprising the steps of forming at least one aperture in a bottom portion of the plastic arcuate member; and engaging a light generating device with the at least one aperature.

14. The method of manufacturing of claim 11 further comprising the step of:

forming the reinforcing portion with a channel having first and second widths and a plurality of ribs disposed in a lattice pattern in only a portion of the channel such that each of the plurality of ribs is disposed at an angle of less than ninety degrees with respect to a longitudinal axis of the reinforcing portion between the first and second exterior surfaces.

15. A bumper for a vehicle comprising:

a one-piece plastic arcuate member defining at least first and second distinct exterior surfaces of the vehicle that extend greater than a width of the vehicle and a reinforcing portion integrally formed with respect to each other, the reinforcing portion having a length and extending between the first and second exterior surfaces, the reinforcing portion including an outwardly-facing channel with respect to the vehicle when the plastic arcuate member is engaged with the vehicle, the reinforcing portion also including a plurality of ribs forming a lattice disposed in the channel; and a one-piece metal arcuate member removably engageable with the one-piece plastic arcuate member adjacent the reinforcing portion and longitudinally centered with respect to the length of the reinforcing portion, the reinforcing portion disposed between the one-piece metal arcuate member and the vehicle when the one-piece plastic arcuate member is engaged with the vehicle, the one-piece metal arcuate member having a width approximately equal to a width of the reinforcing portion such that the first and second exterior surfaces are discontinuous when the one-piece metal arcuate member is engaged with the one-piece plastic arcuate member.

16. The bumper of claim 15 further comprising:

the plurality of ribs is recessed with respect to a top portion and bottom portion of the one-piece plastic arcuate member and each of the plurality of ribs is disposed at an angle of less than ninety degrees with respect to a longitudinal axis of the reinforcing portion between the first and second exterior surfaces.

17. The bumper of claim 15 further comprising:

the plurality of ribs longitudinally centered with respect to the length of the channel.

18. The bumper of claim 15 further comprising:

one of the first and second distinct exterior surfaces defining at least one aperture for receiving a light generating device.

19. The bumper of claim 15 further comprising:

the metal arcuate member formed of stainless steel.

20. The bumper of claim 15 further comprising:

at least one stud plate for removably engaging the metal arcuate member with the plastic arcuate member.

* * * * *